United States Patent [19]

Taubert et al.

[11] Patent Number: 4,820,098

[45] Date of Patent: Apr. 11, 1989

[54] SCREW

[75] Inventors: Hubert Taubert; Rudolf Webendörfer, both of Neuwied, Fed. Rep. of Germany

[73] Assignee: Friedr. Boesner GmbH, Neuwied, Fed. Rep. of Germany

[21] Appl. No.: 729,095

[22] Filed: May 3, 1985

Related U.S. Application Data

[63] Continuation of Ser. No. 364,318, Apr. 1, 1982, abandoned.

[30] Foreign Application Priority Data

Feb. 18, 1982 [EP] European Pat. Off. ........ 82101211.9

[51] Int. Cl.$^4$ .................. F16B 25/00; F16B 35/04
[52] U.S. Cl. ................................ 411/411; 411/412; 411/416
[58] Field of Search ............ 411/414, 412, 413, 411, 411/423, 308, 309, 310, 311

[56] References Cited

U.S. PATENT DOCUMENTS

| 3,426,820 | 2/1969 | Phipard | 411/310 |
| 3,843,984 | 10/1974 | Bagheri et al. | 411/306 X |
| 3,878,759 | 4/1975 | Carlson | 411/423 X |
| 3,918,345 | 11/1975 | Phipard | 411/423 X |
| 3,935,785 | 2/1976 | Lathom | 411/416 X |
| 3,939,512 | 2/1976 | Thurston et al. | 411/416 X |
| 4,040,328 | 8/1977 | Muenchinger | 411/416 X |
| 4,315,340 | 2/1982 | Veldman | 411/416 X |

FOREIGN PATENT DOCUMENTS

| 682375 | 3/1964 | Canada | 411/416 |
| 1022355 | 3/1966 | United Kingdom | 411/416 |

OTHER PUBLICATIONS

Product Engineering, World of Self-Locking Screws Grows, Apr. 1979, p. 57, FIG. 9 & column 2.

Primary Examiner—Rodney M. Lindsey
Attorney, Agent, or Firm—Richard Bushnell; Trexler Bushnell

[57] ABSTRACT

The screw is provided with a three-lobed thread crest, followed by a threaded portion with a three-lobed thread geometry, which passes into a threaded portion with a circular thread geometry. In all three threaded portions the flank angle of the thread is 60° and the flank angle of the thread crests extending beyond the nominal diameter of the screw is 30°.

7 Claims, 2 Drawing Sheets

SCREW

This application is a continuation, of application Ser. No. 364,318, filed Apr. 1, 1982 now abandoned.

BACKGROUND OF THE INVENTION

The invention relates to a screw with a screw body having a thread.

A self-locking and/or vibration-proof connecting member in the form of a locking screw is known, which has a three-lobed geometry of the thread body with a special thread flank angle of 60°/30°. A threaded locking screw constructed in this way is automatically locked in a nut or taphole made from steel, sheet metal or other suitable materials. This is due to the clamping force of the three-lobed thread crests on the metal of the counter-thread and through the intimate contact of the 30° crests on the three-lobed screw periphery with the counter-thread, which prevents longitudinal or transverse movements between the screw and e.g. the nut. Such threaded locking screws are not loosened by oscillations and vibrations. However, it has been found that although such threaded locking screws ensure a high vibration resistance and secure the screw in a completely adequate manner, no seal against the penetration of liquids such as water, hydraulic oil, etc. is ensured. Liquid penetrates between the thread of the locking screw and the counter-thread.

In addition, a screw is known, which forms its own counter-thread without cutting by plastic or ductile working and is constructed in such a way that the screw has a three-lobed geometry of the thread body with a flank angle of 60°. The counter-threads extend over a length of approximately 3 pitches towards the screw end, whilst retaining their marked geometry and the tip of the flank angle of 60°. In order to improve the positioning in the hole and of the screw shoulder, the tip was further developed in such a way that for the first three to four threads of the screw tip the screw is constructed with a smaller diameter, whilst retaining the three-lobed thread shape. In the thread constructions the dimensions of the envelope circle of the three-lobed shape and the 60° flank angle of the thread body are selected in such a way that interchangeability of the shaped nut thread with a screw standard is ensured after screwing up and unscrewing. A screw constructed in this way shapes its own counterthread without cutting, so that there is no need to cut the nut thread. On tapping this screw, the fibre flow in the counter-thread is sealed and workhardened by cold working, the material flowing in clearance-free manner round the thread flanks of this screw without any pitch errors.

BRIEF SUMMARY OF THE INVENTION

The invention solves the problem of providing a screw which, in an existing nut thread cannot only be secured against detachment by vibration, and which shapes its own counter-thread without cutting, but also guarantees a high degree of sealing within the screw thread and the counter-thread, so that the threaded joint does not permit the penetration of moisture and particularly liquid, even if it is under pressure.

The invention also solves the problem of providing a screw having not only thread-shaping characteristics, but also enabling a high degree of sealing to be obtained between the screw thread and the taphole, so that no moisture and in particular no liquid, even if it is under pressure, can penetrate through the threaded joint.

For the purpose of solving the aforementioned problems, the present invention proposes a screw with a screw body having a thread, wherein
  (a) in the vicinity of the first threads at the screw end, the screw is provided with a three-lobed thread shape displaced by in each case 120° on the periphery thereof at the three high points with a screw thread envelope circle diameter which increases from the screw end and with a thread flank angle of 60°, as well as with additional thread crests with a flank angle of 30°,
  (b) a threaded portion, following on to the first threads, having a three-lobed thread shape with constant screw thread envelope circle diameters and with a thread flank angle of 60°, as well as with additional crests with a flank angle of 30° extending beyond the nominal diameter, and
  (c) a further threaded portion, following on to the threaded portion with the three-lobed thread shape, having a circular thread shape in the envelope circle diameter with thread flank angles of 60°, as well as with crests having a flank angle of 30° extending beyond the nominal diameter, the angle of inclination of the plane formed by the external diameter of the thread of the threaded portion with the circular thread shape to that of the external diameter of the thread of the threaded portion with the three-lobed thread shape is approximately 10° to 20° and preferably 13° to to 15°.

Such a screw constitutes a sealing and setscrew in which the first threads at the screw end have three-lobed thread crests in order to form a corresponding geometry in the external diameter of the nut thread, as a function of the strength and ductility of the nut thread with the three-lobed crests. The threads of the three-lobed thread body are dependent on the height of the nut. The three-lobed geometry of the screw tip passes into a circular geometry, whilst retaining the 60°/30° thread flank angle, so that the circular 60°/30° thread tip is inserted without clearance in the pre-formed geometry in the external diameter of the nut thread and consequently the taphole is sealed. As a function of the tolerance zone position of the nut thread the tight fit is produced in the thread, as a result of the frictional resistance, so that this connecting member is given the function of a stud bolt and setscrew. In this way the taphole is sealed and it has surprisingly been found that even liquid supplied under pressure to the area of the taphole is held back and cannot pass through the said taphole.

In order to provide a screw with thread-shaping properties and a seal between the screw thread and the counter-thread, the present invention also proposes a screw with a screw body having a counter-thread, wherein
  (a) on the first three to four threads of the screw tip there is an envelope circle diameter which increases from the screw tip in the direction away from said tip,
  (b) following on to the transition area of the increasing envelope circle diameter there is a threaded portion with a three-lobed thread geometry with constant envelope circle diameters of the screw thread, and
  (c) following on to the threaded portion with the three-lobed thread shape there is a further threaded portion with a circular thread shape in the envelope circle diameter with a 60° thread flank angle corresponding to the dimensions of the counter-thread standard, the angle of inclination of the plane formed by the external diameter of the thread of the threaded portion with the circular thread shape to that of the external diameter of the thread of the threaded portion with the three-lobed thread shape is approximately 10° to 20° and preferably 13° to 15°.

Apart from the excellent self-locking and/or thread-forming characteristics, a screw constructed in this way also provides a high degree of sealing between the screw thread and the counter-thread, the circular 60°/30° or 60° thread crest being inserted without clearance into the pre-formed geometry in the external diameter of the nut thread and consequently the taphole is sealed. The transition from the three-lobed screw body to the circular thread shape in the envelope circle diameter makes a significant contribution to obtaining the sealing action. In the case of the self-shaping screws, this envelope circle diameter corresponds to the external diameter of the nut standard. The flank angles of the self-shaping screws are 60°, corresponding to the flank angles of the screw and nut standards. As a function of the tolerance zone position of the nut thread in the case of the self-locking screw or the tolerance-free, self-producing counter-thread in the self-shaping screw, as a result of frictional resistance a tight fit is also produced in the thread, which gives this connecting element the function of a stud bolt and setscrew. In this way the taphole is sealed and it has surprisingly been found that even liquid supplied under pressure into the area of the taphole is held back and cannot pass through the said taphole.

Advantageous further developments of the invention are described in the subclaims.

BRIEF DESCRIPTION OF THE DRAWINGS

The invention is described in greater detail hereinafter relative to non-limitative embodiments and that attached drawings, wherein show.

DETAILED DESCRIPTION OF THE PREFERRED EMBODIMENTS

Figure 1:
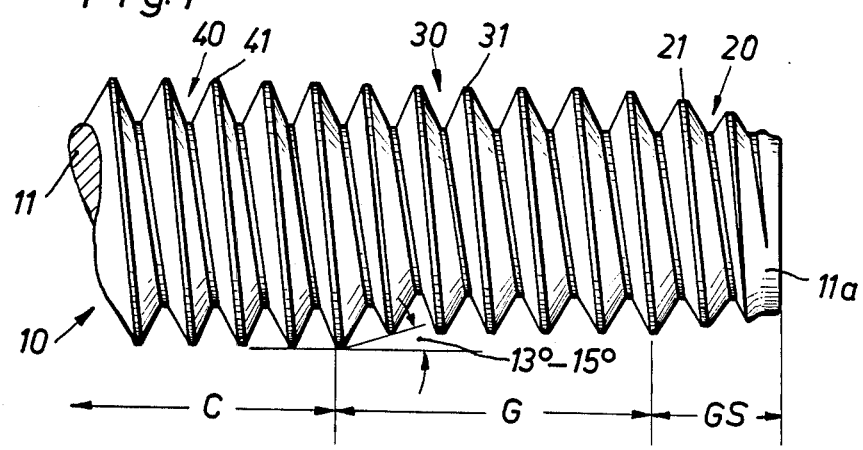
FIG. 1 a side view of a screw shank or body with a three-lobed thread crest, the following three-lobed geometry of the screw body and the following circular thread geometry.
Figure 2:
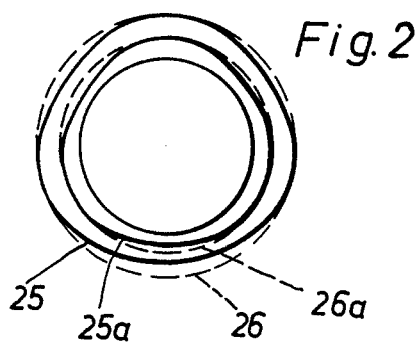
FIG. 2 a vertical cross-section of the screw shank with the three-lobed thread shape of the screw periphery with envelope circles.
Figure 3:
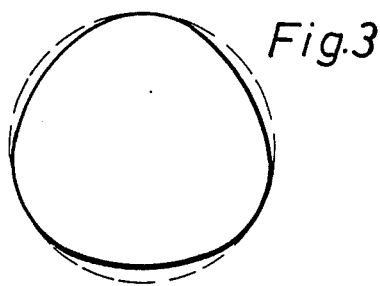
FIG. 3 a cross-section through the screw shank in the vicinity of the circular thread geometry.
Figure 4:
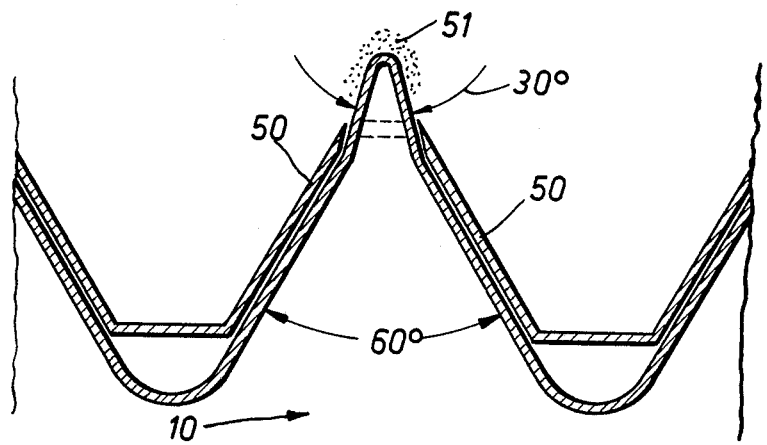
FIG. 4 a larger-scale view of a three-lobed threaded crest in a counterthread.

Screw 10 in FIG. 1 comprises a shank 11, whose end is indicated at 11a. In the vicinity of the first threads 20 on end 11a, screw 10 has a three-lobed thread shape. An envelope circle 26, 26a is associated with each three-lobed thread 25, 25a in order to define the three-lobed cross-sectional shape and to provide dimensions. (FIG. 2). The envelope circle diameters of the screw thread increse from the screw shank end 11a towards the other screw shank end. This three-lobed thread shape, displaced by in each case 120° on its periphery at the three high points and provided with additional crests beyond the nominal diameter, leads to a low torque on screwing in. The crests are provided with flank angles of 60° and in their terminal areas pass into 30° flank angles (FIG. 4).

The three-lobed thread crest GS is followed by a threaded portion with a three-lobed thread geometry on screw shank 11. This thread portion 30 with the three-lobed thread geometry G also has a three-lobed screw periphery, which is constant in said portion 30, i.e. has the same envelope circle diameter. The actual thread has flank angles of 60°, whereas the thread crests 31 are provided with flank angles of 30° (FIG. 4).

This threaded portion 30 with a three-lobed thread shape is followed by a further threaded portion 40 with a circular thread geometry C. The thread of portion 40 also has flank angles of 60°, whereas the crests 41 have flank angles of 30° (FIG. 1).

The two threaded portions 30 and 40 pass into one another with an angle of inclination of 10° to 20° and preferably 13° to 15°. The plane formed by the external diameter of the thread of threaded portion 40 with the circular thread shape passes at an inclination angle of 10° to 20°, preferably 13° to 15° into that formed by the external diameter of the thread of threaded portion 30 with the three-lobed thread geometry.

FIG. 4 shows the thread with the three-lobed thread geometry screwed into the counter-thread, i.e. the thread of a nut or taphole. The counter-thread is designated 50. The material workhardening in the thread crest area is indicated at 51.

In place of the 60°/30° thread flank angle, the screw can have a 60°/40° or 60°/20° or similar angle.

Figure 5:
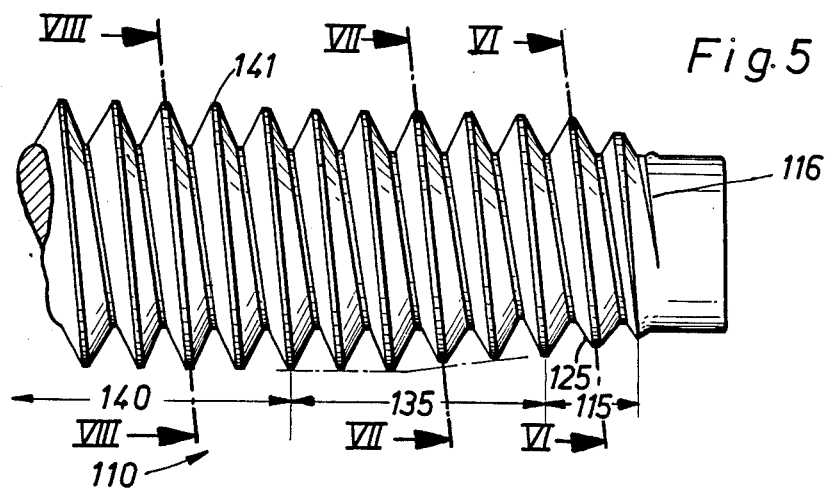
FIG. 5 a side view of a screw shank with thread-shaping characteristics and a circular thread geometry following on to the three-lobed geometry.
Figure 6:
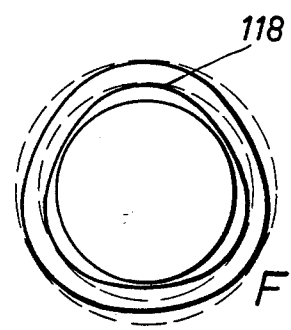
FIG. 6 a vertical cross-section through the screw shank along line VI—VI of FIG. 5.
Figure 7:
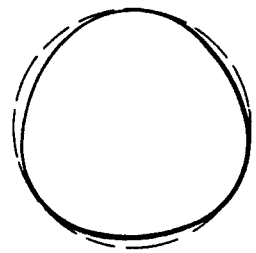
FIG. 7 a vertical section along line VII—VII of FIG. 5.
Figure 8:
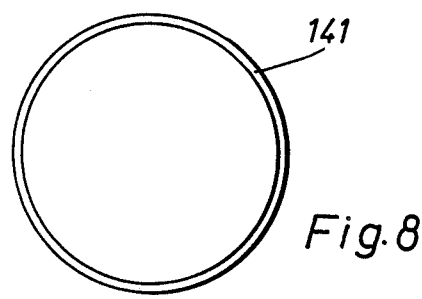
FIG. 8 a cross-section through the screw shank along line VIII—VIII of FIG. 5.

FIG. 5 shows a thread-shaping screw having in the first three or four threads a three-lobed thread geometry with an envelope circle diameter which increases from the screw tip in the direction away from said tip.

A threaded portion 140 with a circular thread geometry follows on to the threaded portion 135 with the three-lobed shape and the enlarging envelope circle. The thread of threaded portion 140 preferably has a flank angle of 60°.

The two threaded portions 135 and 140 pass into one another with an inclination angle of 10° to 20°, preferably 13° to 15°. The plane formed by the external diameter of the thread of threaded portion 140 with the circular thread shape passes at an inclination angle of 10° to 20°, preferably 13° to 15° into that of the external diameter of the thread of threaded portion 135 with the reduced three-lobed thread shape.

The screw can also have a thread flank angle of 30°, 40° or 50°. The geometry of the thread body can also be trilobular or otherwise multilobular with a three-lobed thread shape displaced on its periphery at three high points by in each case 120° or uquadrolobular with four high points displaced by in each case 90°, or duolobular/bilobular with two high points displaced by in each case 180° and provided with a transition from the high points to the circular geometries of the high point diameter. The screw is also provided with a high point external diameter, which does not correspond with a standard nut thread. There can also be a transition from a non-circular thread geometry to a circular thread geometry on the dimension of the envelope circle.

The term "standard" nut threads as used herein is intended to refer to nut threads of the following designation:
ISO
DIN
UNIFIED
WHITHWORTH.

What is claimed is:

1. In combination with a structure having a threaded hole, a screw having a tip and a thread for engagement with the thread of said hole, wherein on the first plurality of turns of the thread running from the screw tip there is an envelope circle diameter which increases away from the screw tip, contiguous with said plurality of turns there being a transition area of increasing envelope circle diameter, and contiguous with said transition area there being a threaded portion with a multi-lobed thread geometry with constant envelope circle diameter of the screw thread and following onto the threaded portion with the multi-lobed thread shape there is a further threaded portion with a circular thread shape in an envelope of circular configuration, said envelope circles being defined by the crest of the thread, there being an angle of inclination between a plane formed by the external diameter of the thread of the threaded portion with the circular thread shape and a plane formed by the external diameter of the thread of the threaded portion with the lobular thread shape, said angle of inclination being such that when taken in conjunction with the magnitude of said external diameter of the threaded portion of circular shape and the dimensions of the thread of said hole enables said last-mentioned threaded portion to be threaded into said hole without clearance to form a liquid tight seal thereat.

2. A combination according to claim 1 in which said screw thread at least in said further threaded portion has a thread flank angle of 60° as well as crests having a flank angle of between 40° and 20° extending beyond the nominal diameter of the thread.

3. A combination according to claim 1 in which the screw thread in said further threaded portion does not correspond to the flank dimensions of the thread of a standard nut thread.

4. A combination according to claim 1 in which said angle of inclination is approximately 10° to 20°.

5. A combination according to claim 1 in which the thread in said hole is a standard nut thread.

6. A combination according to claim 4 in which the thread in said hole is a standard nut thread.

7. A combination according to claim 1 in which the diameter of the thread portion of circular configuration is larger than that of the internal crest diameter of said threaded hole.

* * * * *